United States Patent [19]

Simpson

[11] 3,942,018

[45] Mar. 2, 1976

[54] PRODUCTION OF ULTRA-VIOLET RADIATION

[75] Inventor: David Preston Simpson, Chester, England

[73] Assignee: The Electricity Council, England

[22] Filed: July 9, 1974

[21] Appl. No.: 486,793

[30] Foreign Application Priority Data
July 9, 1973   United Kingdom............... 32593/73

[52] U.S. Cl............................. 250/493; 313/231.6
[51] Int. Cl.² ........................................ H01J 37/26
[58] Field of Search ............ 250/493, 504; 313/232, 313/231.6, 231.7, 170

[56] References Cited
UNITED STATES PATENTS

| | | | |
|---|---|---|---|
| 2,858,468 | 10/1958 | Hedlund | 313/232 |
| 3,024,382 | 3/1962 | Schaefer et al. | 313/170 |
| 3,163,799 | 12/1964 | Buchman | 331/94.5 P |
| 3,290,552 | 12/1966 | Van Ornum | 313/231.7 |
| 3,534,214 | 10/1970 | Volker | 313/231.6 |
| 3,551,737 | 12/1970 | Sheets | 313/231.6 |
| 3,777,208 | 12/1973 | Ryason | 313/231.7 |

*Primary Examiner*—Archie R. Borchelt
*Assistant Examiner*—B. C. Anderson
*Attorney, Agent, or Firm*—Browne, Beveridge, DeGrandi & Kline

[57] ABSTRACT

A method of producing U.V. radiation by effecting an electrical discharge such that at least a part of the discharge path is submerged in water. An apparatus for performing the above method comprises two electrodes spaced apart to form a discharge region, a discharge chamber containing the discharge region, means arranged to apply a high voltage across the electrodes, and means arranged to supply water to the discharge region such that at least a part of the electrical discharge is submerged in the water, at least a portion of the discharge chamber being transparent to U.V. radiation. Also, a method of treating a material comprising producing U.V. radiation as described above in a discharge chamber at least a portion of which is U.V. transparent, passing the material through a treatment chamber adjacent the transparent portion of the discharge chamber; and an apparatus for performing the method of treating a material. In some described embodiments the position of an electrode is adjusted in dependence upon the electrical characteristics of the discharge such as to maintain predetermined conditions. In one embodiment an electrode is mounted in the bottom of the discharge chamber which forms the other electrode; water covers the electrode and has a controlled circulatory motion such as to control the height of water over the electrode and thus the submerged discharge path. In another embodiment one of the electrodes is formed by a layer of mercury; an initiating discharge between a third electrode and the mercury or the other electrode to establish a degree of ionisation of the mercury in the vicinity of the discharge region. The main discharge excites the mercury vapour resulting in radiation at 254 nm.

13 Claims, 11 Drawing Figures

PRODUCTION OF ULTRA-VIOLET RADIATION

BACKGROUND OF THE INVENTION

This invention relates to the production of ultra-violet (U.V.) radiation, and relates particularly, but not exclusively, to a method of, and an apparatus for, treatment of a material by irradiation with U.V. radiation.

It is known to produce U.V. radiation by the discharge of electrical energy through a gas, and a device operating on such a principle is called a gas discharge lamp.

SUMMARY

According to one aspect of this invention there is provided a method of producing U.V. radiation comprising the steps of effecting, in a discharge chamber, an electrical discharge between two electrodes, and arranging for at least a part of the electrical discharge between the two electrodes to be surrounded by a preselected liquid.

The presence of the surrounding liquid prevents the hot plasma of the discharge region between the electrodes from expanding freely, in contrast to the operation of the conventional gas discharge lamp, and as a consequence the plasma can attain a high temperature and pressure with the resultant emission of U.V. radiation.

It will be appreciated that the preselected liquid must have appropriate electrical characteristics to permit the electrical discharge therethrough, and also that the liquid molecules when ionised by the energy of the electrical discharge must emit radiation of a desired wavelength at which the preselected liquid must be substantially transparent. For convenience this discharge will be referred to as a main discharge.

Where one of the electrodes is formed by a preselected conductive liquid immiscible with said preselected liquid, the method may include the step of generating an initiating electrical discharge in the vicinity of the discharge region between said two electrodes just prior to effecting said electrical discharge. This initiating discharge may be generated between a third electrode and either of said two electrodes, and is for the purpose of providing in the discharge region of the main discharge a mixture of the molecules, or even ions, of said preselected liquid and of the liquid electrode.

According to another aspect of this invention there is provided a method of treating a material by irradiation with U.V. radiation, comprising the steps of producing U.V. radiation by a method as described above, transmitting U.V. radiation thus produced through a U.V. radiation-transparent portion of the chamber and disposing the material in a treatment region where it is irradiated by the U.V. radiation transmitted from the chamber.

The material may be treated in batches, and thus may be stationary in the treatment region, or may be treated in a continuous process by transporting the material continuously through the treatment region and continuously effecting electrical discharges at a rate appropriate to the speed of the material to obtain a required treatment. A required treatment may be each element portion of material receiving U.V. radiation from two discharges, or three discharges, and a minimum treatment may be each elemental portion being irradiated once and once only.

The material may be solid, e.g. bandage to be sterilized, or liquid. In the latter case the treatment region will be constituted by a chamber through which the liquid flows. The discharge chamber may conveniently be a sealed chamber, and this avoids splashing-out of drops of the preselected liquid ejected from the discharge region. Where it is not required for the chamber to be sealed, it may have an open top portion which constitutes the or a part of the U.V. transparent portion of the chamber.

Where the material to be treated is a liquid, the transporting step preferably comprises feeding the liquid to be treated through a treatment chamber which constitutes the treatment region. The treatment chamber may be outside or inside the discharge chamber and have inlet and outlet passages for the flow therethrough of the liquid to be treated. By the term 'inside' is meant that the discharge chamber encircles the treatment chamber, and by the term 'outside' is meant that the discharge chamber does not encircle the treatment chamber. In the latter case it will be understood that the treatment chamber may encircle the discharge chamber.

It will be appreciated that the thickness or depth of the treatment chamber will depend on the degree of absorption of U.V. radiation by the liquid to be treated and will be such that the extreme regions of this liquid will still receive an adequate amount of U.V. radiation appropriate to the particular treatment.

There may be included the step of automatically adjusting the length of the part of the electrical discharge which is surrounded by the preselected liquid such as to maintain predetermined electrical characteristics of the electrical discharge. Where the whole of the electrical discharge is so surrounded, the spacing between the electrodes will be altered, either or both of the electrodes being moved. In one form of this invention the main discharge occurs from the tip of an electrode submerged in said predetermined liquid, through the liquid direct to the surface thereof, and then along the surface to the wall of the chamber which is conductive and forms the other electrode for the discharge. In the operation of such a form, the length of the submerged part of the discharge path can be altered by causing the preselected liquid to have a circulating motion which results in a raising of the level of the peripheral surface regions and a depression of the central surface region. The submerged electrode is preferably arranged directly under the region where greatest depression occurs to obtain maximum sensitivity i.e. the maximum change in submerged length of the discharge path for a given circulatory speed of the preselected liquid.

According to a further aspect of this invention there is provided an apparatus for producing U.V. radiation comprising two electrodes spaced apart to form a discharge region therebetween, a discharge chamber containing the discharge region, first means arranged to apply high voltage between the electrodes, and means arranged to supply a preselected liquid to the discharge region such that, on application of the high voltage an electrical discharge occurs between the electrodes, at least a part of this discharge being along a submerged path in the preselected liquid, and at least a portion of the discharge chamber being transparent to the U.V. radiation whereby U.V. radiation produced may be transmitted from the discharge chamber.

One of the electrodes may be in the form of a rod mounted in the wall of the chamber, and the other electrode may be in one of several alternative forms. Firstly the other electrode may be in the form of a rod similar to the said one electrode and similarly mounted in the wall of the chamber; secondly the other electrode may be formed by the chamber itself provided that it is formed of a conductive material, or if not, then formed with a conductive coating on its inner surface; thirdly the other electrode may be in the form of a layer of a preselected conductive liquid, preferably mercury, which is immiscible with said preselected liquid and which is disposed at the bottom of the discharge chamber, it will be appreciated that in this last case said one electrode would be disposed in the chamber above the surface of the conductive liquid. In this specification the term rod includes an electrode having a channel for liquid flow. The channel may be in the form of an axial bore or a hollow cylindrical annulus.

One preferred form of discharge chamber is formed as a hollow cylinder having two end portions having flat inner surfaces and a hollow cylindrical intermediate portion having a cylindrical inner surface. In this case the two electrodes may be in the form of rod electrodes, each axially mounted in a respective end portion such that the discharge region between the electrodes is approximately at the centre of the chamber. Either an end plate forming an end portion of the chamber, or a tube forming the intermediate portion of the chamber, or both of these, may be formed of a material, preferably quartz, transparent to U.V. radiation An apparatus for producing U.V. radiation may be used in the treatment of materials by irradiation with U.V. radiation. Where such a material is a liquid, a treatment chamber having inlet and outlet passages for the flow therethrough of a liquid to be treated may be provided either externally or internally of the discharge chamber.

A treatment chamber internally of the discharge chamber may be formed by a hollow tube of U.V. transparent material, preferably quartz, passing through the discharge chamber. In this case it will be appreciated that the U.V. transparent wall is common to the treatment chamber and the discharge chamber and constitutes the aforementioned portion transparent to U.V. radiation. Also, the end walls and the intermediate portion of the chamber need not be U.V. transparent unless specifically required. The treatment chamber may be constituted by a plurality of the hollow tubes which may be symmetrically arranged around the axis of discharge chamber. The electrodes may be mounted in the end portions or in the intermediate portion.

The inner surfaces of the chamber may be made highly reflective by mechanical treatment, e.g. polishing, to make maximum use of the generated U.V. radiation. If required, the intermediate portion may have an elliptical cross-sectional shape as alternative to the cylindrical shape. The electrodes may be arranged such that the electrical discharge is at one of the foci, and the treatment chamber, e.g. one or more hollow tubes, would then be arranged at the other focus.

A form of treatment chamber which can be utilised with a U.V. transparent cylindrical intermediate portion is one which is a cylindrical annulus formed between the outer cylindrical surface of the intermediate portion, and the inner cylindrical surface of a sleeve mounted between the end portions. The mounting of the end portions to the intermediate portion and to the sleeve will be such as to seal the discharge chamber from the treatment chamber.

One end portion of the discharge chamber may be made U.V. transparent and means may be provided for producing a thin film flow of liquid to be treated across the outer surface of this end portion. One form of such means for producing a thin film flow may be a plate spaced from the end portion such as to form a thin disc-like chamber. The inlet and outlet passages are arranged such that the thin film flow is substantially radial within the treatment chamber. Preferably the inlet passage is aligned with the axis of the chamber, and the outlet passage communicates with the peripheral regions of the treatment chamber via an annular collecting chamber therearound.

In one form of an apparatus the axis of the intermediate portion is arranged vertically and an electrode is mounted axially in the bottom end portion, being insulated therefrom. Liquid inlet and outlet passages are arranged to provide a constant head of liquid in the chamber such that the tip of the electrode is submerged in the liquid. The inlet passage is arranged such that a rotational movement is imparted to the liquid thereby to cause the level of liquid above the electrode tip to decrease. The electrical discharge is from the electrode tip to the surface of the liquid, and then along the surface to the inner surface of the intermediate portion which is conductive or has a conductive coating thereon and acts as an electrode. Means may be provided for controlling the rate of flow of liquid into the discharge chamber in dependence upon the electrical parameters of the discharge in order to maintain automatically constant discharge conditions. The inner surface of the discharge chamber may in such an apparatus be shaped to enhance the irradiation of a treatment chamber at the top of the chamber, and may be for example a hollow hemisphere or parabolloid, polished or treated if required to increase the reflectivity of the material.

A cheap and convenient form of the preselected liquid through which the electrical energy is discharged is water, either commercial or distilled.

The electrodes should be formed of a rigid material resistant to corrosion and electrically conductive. A convenient material is stainless steel, and if required the discharge chamber may also be formed of stainless steel.

It is possible to use, say, water, as the liquid to surround the hot plasma of the discharge region and yet to introduce selected molecules of another material into the discharge region for excitation by the electrical discharge in order to obtain an emitted radiation characteristic of this other material. A preferred form of this material is mercury which when excited emits U.V. radiation at 254 nm wavelength. A preferred form of an apparatus for achieving such excitation of the molecules of the material is arranged with the axis of its cylindrical intermediate portion vertical. There is an inlet at the bottom of the discharge chamber for connection to a supply of mercury for establishing a predetermined static height of mercury in the chamber. Further inlet and outlet means permit a swirling flow of water on top of the mercury. A first electrode is mounted in the wall of the discharge chamber and extends through the water to a point just above the surface of the mercury, which forms a second electrode, and on or near the axis of the chamber. Another electrode is similarly mounted and also extends through the water to another point adjacent the first point. Means are provided for applying a high voltage between the other electrode and either the first electrode or the mercury to cause an initiating discharge which results in mercury molecules being interspersed with water molecules in the region between the first electrode and the mercury. A main electrical discharge between the first electrode and the mercury may be synchronised with the initiating discharge.

In order to maintain the electrical parameters of the discharge the rate of inflow of the water may be controlled; the swirling water induces a corresponding swirling movement of the mercury by friction. Alternatively, the water need not be swirling and the height of the mercury in the discharge chamber may be adjusted by control of the head of the mercury supply.

It will be appreciated that electrodes must be electrically insulated from each other if there is to be a high voltage applied between them. Preferably the electrodes, other than liquid-type electrodes or those formed by the discharge chamber walls, are mounted in an insulating sleeve which is sealingly secured in a wall of the chamber.

Instead of introducing water into the chamber via an inlet in the wall, the water may be introduced (and removed if required) via a passage or passages through the electrode, or between the electrode and the inner surface of its sleeve.

In order to absorb selectively an unwanted wavelength or range of wavelengths, or reflect selectively a wanted wavelength or range of wavelengths, an appropriate coating may be applied to a surface of the discharge chamber or of the treatment chamber. Selective absorption may also be achieved by the use of an appropriate material as the U.V. transparent portion of the discharge chamber. Conveniently this material may be quartz doped with a metallic ion for example, tungsten.

DETAILED DESCRIPTION

Figure 1:
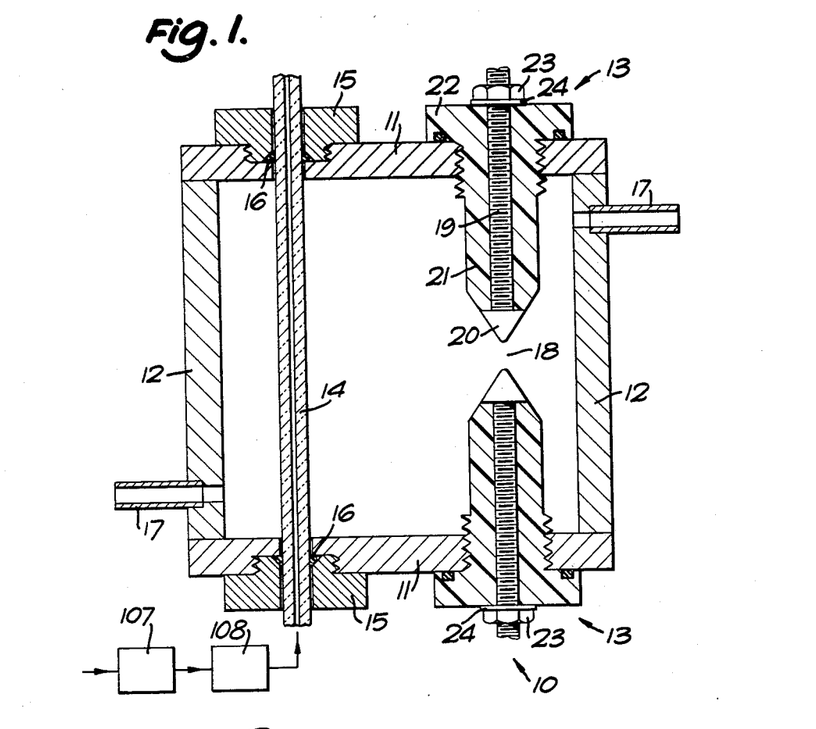
FIG. 1 is an axial section through an apparatus for generating U.V. radiation.

In FIG. 1 a U.V. radiation generating apparatus comprises a chamber 10 formed by metal end plates 11 sealed to the respective open ends of a tubular metal portion 12 shaped such that the chamber has a uniform elliptical transverse cross-section. The inner surfaces of the chamber are polished such that they are highly reflective in the U.V. region of electromagnetic radiation.

An electrode assembly 13 is sealingly mounted in each end plate 11 with the longitudinal axes of the assemblies 13 substantially coincident with the straight line locus of one of the foci of the elliptical section of the chamber. A hollow tube 14 formed of quartz passes through the chamber substantially coaxial with the locus of the other focus, and is sealingly secured to the end plates by means of nuts 15 and associated 0-rings 16. The hollow tube 14 defines a passage through the chamber for liquid to be treated by U.V. radiation. The liquid to be treated is supplied via pump 107 and flow rate control means 108.

Inlet and outlet tubes 17 are mounted in the wall of the tubular portion 12 for enabling a flow of liquid through the chamber. The discharge region 18 between the two electrode assemblies 13 is initially completely occupied by the liquid and upon application of a high voltage between the electrode assemblies 13 and electrical discharge occurs therebetween. Liquid in an adjacent the discharge region vaporizes and tries to expand but this expansion is resisted by the inertia of the liquid. If there are pumping means associated with the inlet and outlet tubes for pumping the liquid through the chamber, the liquid may have no free outlet and be effectively confined to the chamber and the expansion is further resisted by the incompressible nature of the liquid.

The liquid vapour in the discharge region attains an extremely high temperature and pressure resulting, by the choice of an appropriate liquid, in the emission of U.V. light. Because of the constrained discharge region this method of generating U.V. light is more efficient than a conventional method employing a gas discharge lamp.

The two electrode assemblies 13 are identical and each comprises a solid cylindrical stainless steel electrode 19 having an integral enlarged head portion 20 of substantially conical form with a radiussed tip portion. The electrode 19 is threaded along its length and is screwed into an insulating sleeve 21 which has its end adjacent the enlarged head 20 shaped to the same conical section as the head 20 so that there is no discontinuity of the surface of the assembly at the junction betwen the sleeve 21 and the enlarged head 20. The sleeve is formed from a phenolic laminate.

The sleeve 21 is sealingly mounted in its respective end plate by means of an enlarged diameter flange portion 22 at the outer end of the sleeve, an externally threaded portion on the sleeve mating with an internally threaded mounting hole in the end plate, and an 0-ring seated within a channel in the mating surface of the flange portion 22.

A lock nut 23 and washer 24 are provided on the electrode 19 in order to prevent relative movement between the electrode and its sleeve.

Alternative forms of the above described apparatus of FIG. 1 may differ in one or more of the following respects:

the shape of the enlarged head portion 20 may be hemispherical instead of conical; the electrode 19 may be threaded only in the region where locknut 23 is to be mounted, and the sleeve 21 may not be internally threaded, or may only be threaded over a portion of its bore; the enlarged head portion 20 may be non-integral and secured to the electrode by, for example, a screw thread or soldering; the metal of the electrode may be tungsten; thorium oxide may be added to the stainless steel or tungsten to increase the electron emission; the tip region of the head portion may be formed as an insert of a material different from that of the electrode and head portion; one or both of the electrode assemblies may have means, for example a separate locknut on the externally threaded portion of the sleeve, for enabling the position of the electrode assembly to be adjusted; the transverse cross-section of the tubular portion 12 may be circular instead of elliptical; either or both of the electrode assemblies may be mounted in the wall of the tubular portion; there may be a plurality of hollow tubes 14 mounted parallel to, and closely spaced from, each other; the insulating sleeves may be formed from another resilient material for example polyethylene or polytetrafluoroethylene; the tubular portion and the end plates may be formed from a plastics material, or a glass or ceramic material; if required, the material of the end plates may be different to that of the tubular portion; the inner surfaces of the chamber may be made reflective by means of metallising or electroplating with a suitable metal, for example, chromium.

Figure 11:
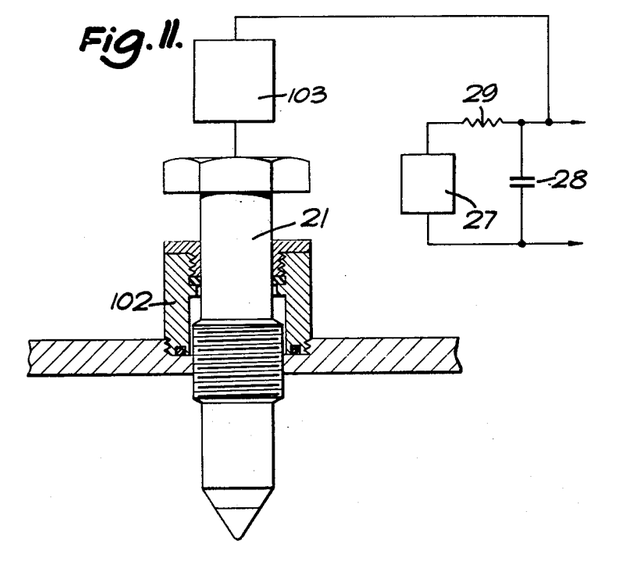
FIG. 11 is a schematic representation of an arrangement for adjusting the position of an electrode.

The positions of the electrode assemblies may be adjusted to alter the dimensions of the discharge region 18 upon initially setting-up the discharge conditions and subsequently in order to compensate for erosion of one or both of the head portions of the electrode assemblies. An arrangement for enabling adjustment of the position of an electrode is shown schematically in FIG. 11 where a sealing device 102 around sleeve 21 seals to end plate 11 and to sleeve 21. A driving means 103 is responsive to the electrical conditions of the discharge and is arranged to turn sleeve 21 in dependence thereupon.

The diameter of the bore of the hollow tube(s) 14 is chosen to obtain a desired rate of flow of liquid to be treated by U.V. radiation. The maximum linear velocity of liquid in the tube (s) is determined by the repetition rate of the electrical discharge, in other words, the maximum velocity is that beyond which there is less than 100% irradiation of the liquid flowing through the hollow tube(s).

The wall thickness of the hollow tube(s) is chosen such that the tube has sufficient mechanical strength to withstand pressure fluctuations generated by the electrical discharges. Quartz is a suitable material since it provides the necessary mechanical strength and also is substantially transparent in the U.V. region of the radiation emitted from the discharge region.

Where the transverse cross-section of the tubular portion is circular, the electrode assemblies may be disposed longitudinally aalong the axis of the tubular portion; and where there is a plurality of hollow tubes 14, these may be parallel to this axis and arranged symmetrically therearound at a convenient radius.

Figure 2:
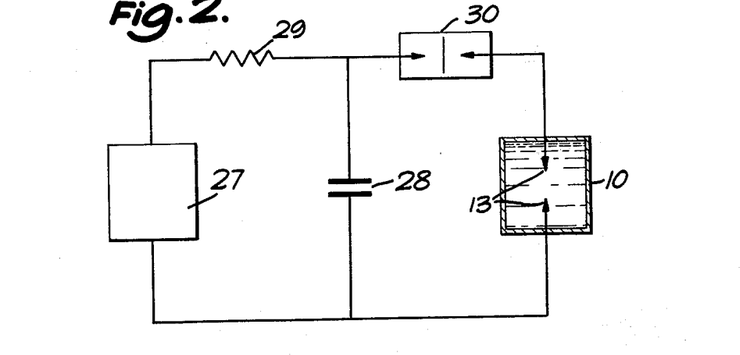
FIG. 2 is a schematic diagram of the electrical circuit of the apparatus of FIG. 1.

The electrical circuit shown in FIG. 2 comprises a high voltage D.C. power supply 27 connected to a capacitor 28 via limiting resistor 29. In practice, resistor 29 may be mostly formed by the secondary resistance of the high voltage transformer utilised in the power supply 27.

At a suitable point in the charging cycle, normally at or near the maximum voltage attainable on the capacitor, a high-speed high voltage switch 30 is actuated by means (not shown) to connect the capacitor to the electrode assemblies 13 in the chamber 10, thus causing an electrical discharge in the liquid in the chamber.

The high voltage D.C. supply 27 provides an unsmoothed unidirectional output, using either full or half-wave rectification. The means for actuating the switch 30 is synchronised with the frequency of the mains source for the supply 27 to provide a repetitive electrical discharge. Thus provided that capacitor 28 can be sufficiently charged in half a period of the mains frequency, the electrical discharges can be maintained at a frequency of twice the mains frequency.

The discharge circuit parameters (i.e. the resistance and inductance of the discharge current path from capacitor 28 via switch 30 to electrode assemblies 13; and also the value of the capacitor 28, and the voltage applied across it) are all chosen in such a way as to result in the discharge occurring in chamber 10 having the required characteristics, as regards pressure, temperature and duration. Typical values might be:

| | |
|---|---|
| capacitance | 0.2$\mu$F |
| voltage | 20 kV |
| inductance | 2 $\mu$H |
| resistance | 0.5 $\Omega$ | resulting in typical discharge parameters as:-

| | |
|---|---|
| temperature | 15,000°K |
| pressure | 10 Kbar |
| duration | 20 $\mu$sec |

But any other values may be incorporated in the circuit, as may seem appropriate to adapt the discharge of different types of U.V. treatment.

The liquid within which the electrical discharge is to be effected should be at least partially, and preferably substantially, transparent to U.V. radiation. The electrical characteristics of the liquid should be such as to give an appropriate form of discharge, between the electrodes. A convenient liquid is water, either distilled or industrial.

As an alternative to introducing and removing the water via inlet and outlet tubes 17, either or both of the electrode assemblies may be adapted to provide a liquid flow channel for delivery or extraction of water. Thus the chamber may have a single tube 17, either or both of the electrode assemblies having a flow channel; the direction of flow may be in either direction i.e. into or out of the tube 17. In another arrangement the chamber may have no tube 17 and in this case both of the electrode assemblies will have flow channels, the water being introduced via one of the electrode assemblies and removed via the other assembly.

Figures 3, 4, 5, 6, 7:
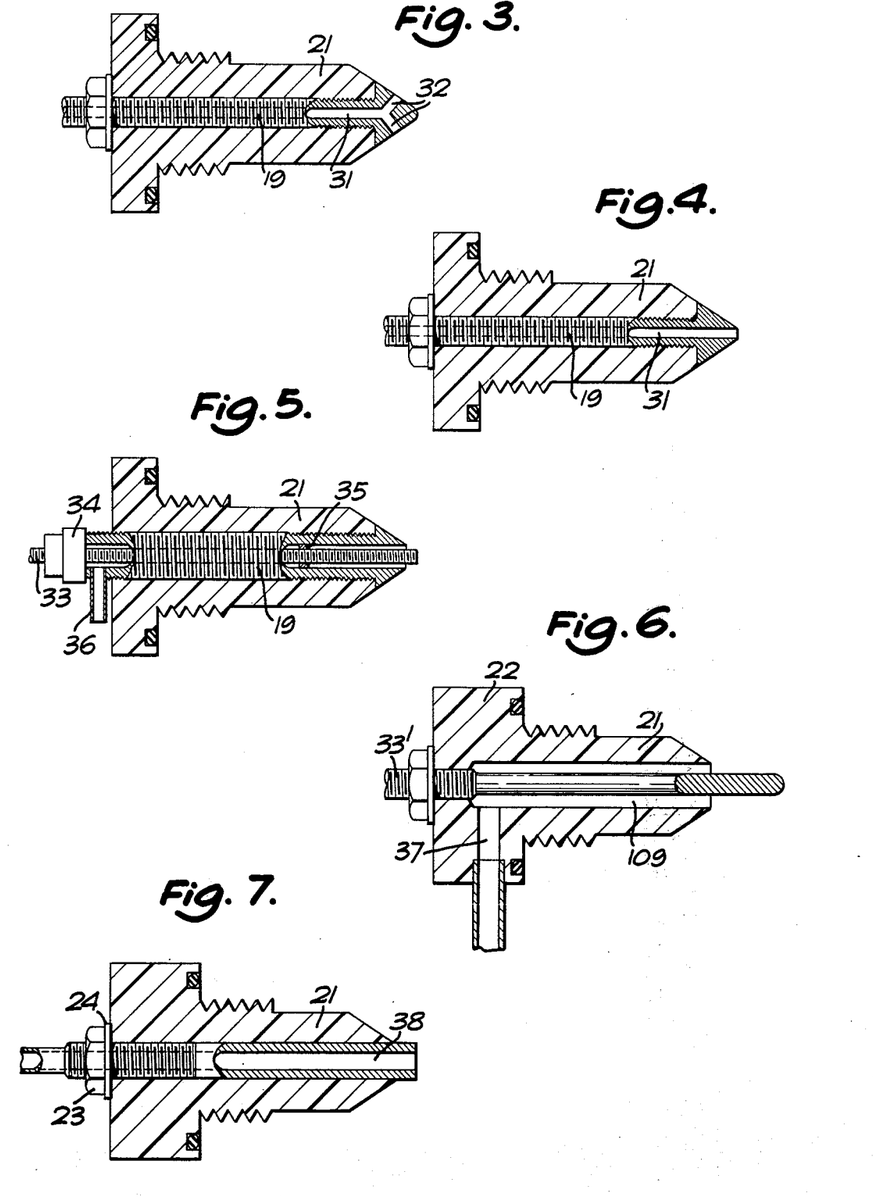
FIG. 3 is a longitudinal section of an alternative form of the electrode assembly of the apparatus of FIG. 1.
FIG. 4 is a longitudinal section of another aalternative electrode assembly.
FIG. 5 is a longitudinal section of yet another alternative electrode assembly.
FIG. 6 is a longitudinal section of a further alternative electrode assembly.
FIG. 7 is a longitudinal section of a still further alternative electrode assembly.

FIG. 3 shows one form electrode assembly having a channel for the introduction or removal of the water. The electrode 19 has a cylindrical bore 31. At the inner end of the electrode the bore communicates with the conical surface of the head portion via a plurality of symmetrically arranged short passages 32. The axes of the passages 32 are arranged approximately normal to the conical surface of the head portion.

In FIG. 4, which shows a modification of FIG. 3, the electrode 19 is provided with a cylindrical bore which passes centrally through the head portion and issues at tip of the head portion.

FIG. 5 shows a different form of electrode assembly having such a channel. In this assembly, a solid threaded cylindrical electrode portion 33 is supported within a large bore in an electrode 19. An internally threaded plug 34 supports the electrode portion 33 centrally and seals thereto and to the outer end of electrode 19. An apertured spacer 35 disposed near the inner end of the assembly maintains the correct spacing of the electrode portion 33 within the electrode 19. A passage 36 communicates through the wall of electrode 19 with the annular flow channel between electrode portion 33 and electrode 19. The position of the electrode portion 33 can be adjusted by means of the plug 34 in order to alter inter-electrode gap. If required the sleeve may also have an adjusting arrangement as mentioned in connection with the apparatus of FIG. 1.

FIG. 6 shows a modification of the assembly of FIG. 5 in which the electrode 19 is omitted, and the flange 22 of the sleeve 21 is adapted to support directly an electrode portion 33' similar to portion 33. An inlet passage 37 is provided in the flange 22 and communicates with the annular flow channel 109 around electrode portion 33'.

In the electrode assembly shown in FIG. 7, the electrode is in the form of a hollow cylindrical tube 38, a portion of the outer surface of which is threaded to engage internal threads at the flange of the sleeve 21. The tube 38 is maintained in position by means of locknut 23 and washer 24. The outer end of tube 38 is adapted to be connected to a hose or pipe for the introduction or removal of water, and the inner end protrudes a short way beond the frusto-conical surface of the inner end of sleeve 21. The annular inner end surface of tube 38 is substantially flat and normal to the axis of the tube.

Figure 8:
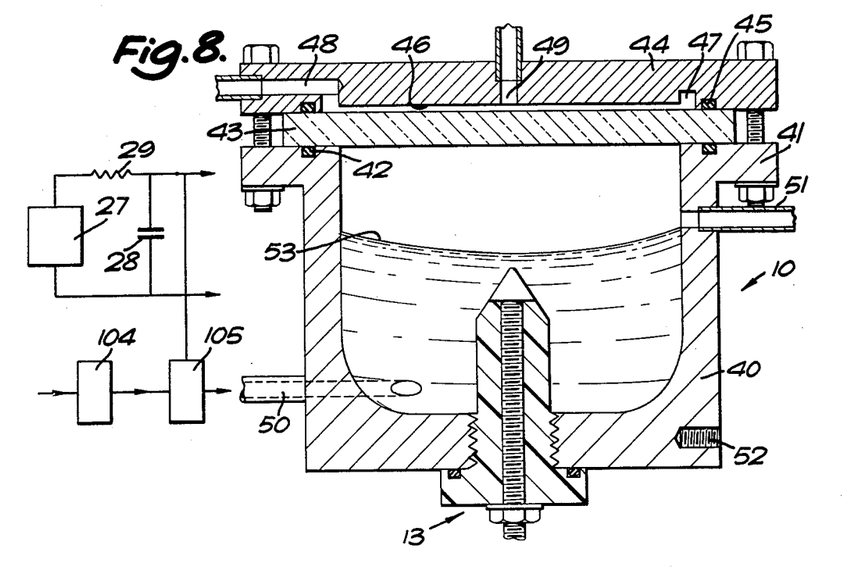
FIG. 8 is an axial section of an alternative embodiment to the apparatus of FIG. 1.

FIG. 8 shows another embodiment of an apparatus for generating U.V. radiation. The chamber of the apparatus comprises a cup-shaped lower portion 40 formed of stainless steel and having an external flange 41 around its rim. Sealed to the rim of portion 40 by means of O-ring 42 is a disc of quartz 43, and an end plate 44 formed of stainless steel is sealed to the upper surface of disc 43 by means of O-ring 45. End plate 44 is held secure by means of a plurality of securing-bolts passing through the peripheral regions of the end plate 44 and the flange 41. The underside of end plate 44 has a circular recess 46 surrounded by an annular channel 47 which leads to an outlet passage 48 in the peripheral region of end plate 44. The depth of the recess 46 is made approximately equal to the maximum depth of penetration of U.V. radiation of appropriate wavelength in the liquid medium to be treated. A central inlet passage 49 introduces liquid to be treated through the end plate 44 into the narrow circular chamber provided by recess 46 in conjunction with the upper surface of disc 43. This liquid flows radially outwardly, substantially in the form of a thin film, into the channel 47 and then flows out via passage 48. The inner surfaces of portion 40 and end plate 44 are rendered optically reflective by polishing, although other methods of achieving this may be used as previously mentioned.

An electrode assembly 13, substantially identical to those in the apparatus of FIG. 1, is axially mounted in the bottom of the portion 40. An inlet pipe 50 introduced water into the interior of portion 40 close to its bottom and is positioned such that the incoming flow is substantially tangential to the transverse cross-section shape of the portion 40 at the level of inlet pipe 50. An outlet pipe 51 is set into the side wall of portion 40 a short distance (typically 5 mm) above the level of the tip of the electrode assembly and defines the static surface level of water in the chamber. The portion 40 acts as an electrode, electrical connection being made thereto by means of a threaded hole 52.

The effect of introducing water into the chamber as a tangential flow results in a circulating motion of the water in the chamber. This motion causes a depression of the water surface 53 above the electrode assembly and a corresponding rise of the surface near the walls of portion 40. The amount of this depression is dependent upon the rotational speed of the water and can thus be altered by controlling the inlet flow by a pump 104 and fluid control valve 105 linked to the high voltage generating circuit, in known manner, automatically to maintain the electrical parameters of successive discharges at predetermined values. In this way the effects of wear, erosion or other loss of material from the tip of the electrode may be compensated for.

The electrical discharge is from the tip of the electrode to approximately the nearest point of the water surface 53 and is completed by "tracking" or further electrical breakdown across the water surface. Since the tracking will occur along random radial paths to the side walls of portion 40, there will be a spreading of the effects of wear and erosion. Also, since as a result of wear of the electrode assembly the rotational speed of the water is increased, the level of the discharge termination points will vary and further spread the effects of wear.

The height of portion 40 is selected such that disc 43 will not be damaged by droplets or jets of water thrown up from the discharge region.

The portion 40 has its inner surface shaped such as to direct radiation from the discharge region in the direction of the disc 43. Such a shape may be, for example, a paraboloid of revolution arranged such that the discharge region is approximately at the focus of the paraboloid. Alternatively, the lower part of the inner surface may be hemispherically arranged such that the discharge region is approximately at the centre of the hemisphere.

The flow rate of liquid to be treated is fed via pump 107 (FIG. 1) and flow control means 108 (FIG. 1) which is controlled in dependence upon the discharge rate such that there is at least 100% irradiation. If required, the time taken for liquid to flow from inlet passage 49 into channel 47 may be made several times the period of the electrical discharges.

Figure 9:
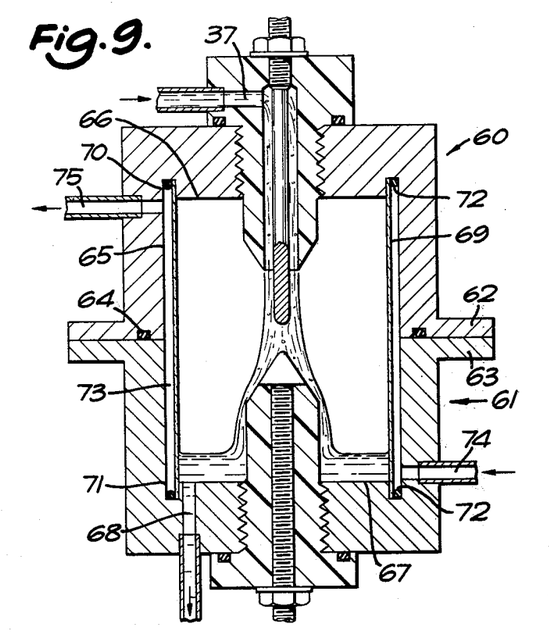
FIG. 9 is an axial section of another alternative embodiment to the apparatus of FIG. 1.

FIG. 9 shows another embodiment of U.V. radiation generating apparatus comprising substantially identical upper and lower stainless steel chamber portions 60 and 61, respectively, which are clamped together by securing bolts (not shown) passing through respective flanges 62 63, and sealed together via O-ring 64. The chamber has a cylindrical side wall 65 and flat upper and lower end walls 66, 67.

Mounted in the lower chamber portion 61 axially with respect to the chamber is an electrode assembly substantially as utilised in the apparatus of FIG. 1. An electrode assembly as shown in FIG. 6 is correspondingly mounted in the upper chamber portion 60. Water introduced into the chamber via inlet passge 37 of the upper electrode assembly flows downwardly through the annular passage of this assembly and exits at the open tip of the sleeve of the assembly. The falling column of water crosses the discharge region between the electrode assemblies and then flows downwardly over and around the lower electrode assembly, continuously enveloping the tip of head portion of the lower electrode assembly. A drain passage 68 is provided in the lower chamber portion 61 for the removal of water accumulating in the bottom of the chamber. The two electrode assemblies are arranged such that the discharge region between them is substantially at the middle of the chamber cavity, the electrical discharge being substantially along the axis of the column of water.

The diameter of the bore in the sleeve of the upper electrode assembly determines the radius of the column of water at the discharge region, and is chosen to provide the required temperature and pressure of the plasma generated in the discharge region.

A thin-walled cylinder of quartz 69 is secured between annular grooves 70, 71 in the inner surfaces of end walls 66, 67, respectively. The wall thickness is about 1 mm. O-rings 72 space the cylinder 69 from the inner cylindrical surface of side walls 65 to form a treatment cavity 73 in the shape of a cylindrical annulus; the O-rings also seal the treatment cavity 73 from the cavity of the chamber. The thickness of the cavity 73 will be determined by the maximum penetration of U.V. radiation in the liquid to be treated. The radius of the quartz cylinder 69 is approximately 20 mm and is chosen such that there should be no damage caused by water droplets driven out of the discharge region by the explosive force of the electrical discharge, and also such as to obtain a desired intensity of U.V. radiation at the treatment cavity.

An inlet passage 74 is provided in the bottom of the cylindrical wall 65 for introducing liquid to be treated into the cavity 73, and an outlet passage 75 is provided in the top of the wall 65 diametrically opposite passage 74 for the outflow of the liquid from cavity 73.

The rate of flow of liquid to be treated and the electrical discharge repetition rate and interdependent as mentioned previously. If a discharge rate at the frequency of the mains supply, or some multiple therefof, is not suitable, than an alternative electrical circuit may comprise an electronic pulse generator of known form adapted to operate at any required frequency and coupled to a known form of high-voltage triggered spark gap.

If it is required to prevent a particular wavelength or small range of wavelengths of the generated radiation from entering the treatment cavity 73, the outer surface of the quartz cylinder 69 may have a thin film of absorbing material deposited thereon. Alternatively, a thin film may be deposited thereon of such thickness as to prevent transmission by means of optical interference. Alternatively, or additionally, the quartz may be "doped" with a suitable metallic ion, for example, tungsten. A protective layer of magnesium fluoride would be deposited on top of any thin film on the outer surface of the quartz cylinder 69 in order to avoid any chemical interaction between such thin film and the liquid to be treated.

The inner metal surfaces are polished so as to be highly reflective at U.V. wavelengths. Alternatively, other methods may be used, as mentioned previously.

The inner cylindrical surface of side wall 65 may have thin films for selective absorption deposited thereon in the same manner as the outer surface of quartz cylinder 69. Alternatively, or additionally, a thin film may be deposited thereon for the selective reflection of specific wavelengths or a range of wavelengths.

In an alternative form of the apparatus of FIG. 9, the upper electrode assembly may be of the form shown in FIG. 7, in which case the radius of the bore of tube 38 will determine the radius of the column of water at the discharge region. The electrical discharge will occur from a point on or near to the inner edge of the annular end face of tube 38, downwardly along the surface of the water column to a point near the head portion of the lower electrode assembly, and thence through the body of the water column to a point on the surface of the head portion of the electrode assembly. The radius of the bore of tube 38 will be chosen to provide a required submerged-discharge path length which results in a discharge of required characteristics.

Figure 10:
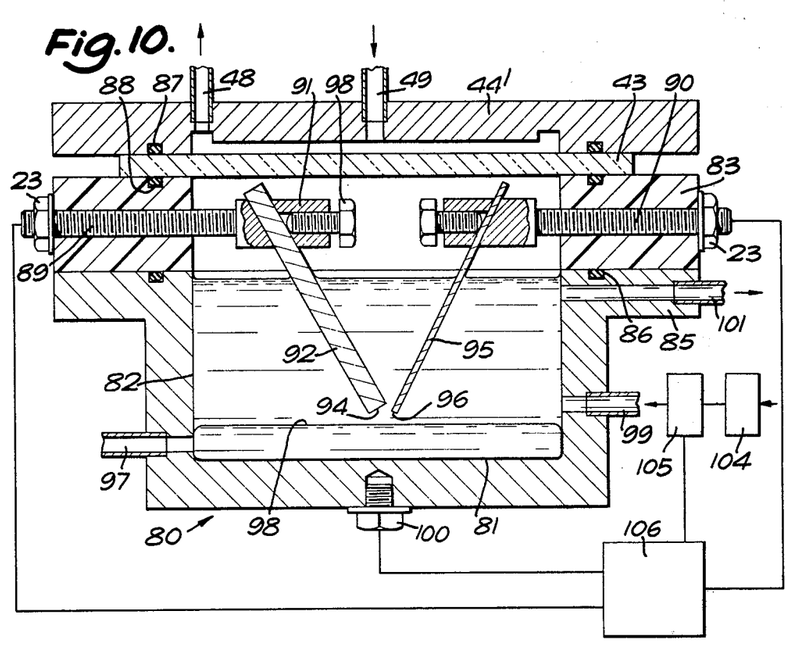
FIG. 10 is an axial section of a further alternative embodiment to the apparatus of FIG. 1.

FIG. 10 shows another embodiment of an apparatus for generating U.V. radiation which comprises a lower chamber portion 80 formed of stainless steel and having a flat bottom wall 81 and a cylindrical inner side wall 82. An annular ring portion 83 formed of insulating material is mounted on top of lower chamber portion 80 by means of securing bolts 84 (not shown) in conjunction with flange 85 on chamber portion 80, and O-ring 86. Mounted on top of ring portion 83 by means of bolts 84 and O-rings 87 and 88 is a quartz disc 43 and an end plate 44' which differs from the end plate 44 used in the apparatus FIG. 8 only in that the outlet passage 48 is parallel to the inlet passage 49 instead of being at right angles thereto.

Electrode carriers 89 and 90 are mounted diametrically opposite each other in ring portion 83. Electrode carrier 89 comprises a threaded rod having an enlarged diameter unthreaded head portion 91. Electrode 92 formed from 5 mm diameter stainless steel bar has one end secured in an angled bore passing through head portion 91. A set screw 93 engaging in a threaded axial bore communicating with the angled bore serves to hold the electrode 92 secure. The depth of penetration of the electrode carrier 89 into the chamber cavity, and the effective length of electrode are chosen such that the working end face of 94 of electrode 92 is substantially on the axis of the chamber.

Electrode carrier 90 is similar to electrode carrier 89 but is arranged to carry a 1 mm diameter stainless steel electrode 95 having a working end face 96, and is arranged such that the end face 96 is adjacent end face 94 at substantially the same distance from bottom wall 81.

Near the bottom of chamber portion 80 there is an inlet passage 97 connected to a supply (not shown) of mercury having an adjustable head such that the height, nominally about 1 cm, of mercury in the bottom of the chamber cavity can be altered. The surface 98 of the mercury is nominally about 5 mm below the end face 94 of electrode 92.

An inlet passage 99 communicates with the chamber cavity for the introduction of water at approximately the same level as the level of end face 94. Inlet passage 99 is arranged such that the incoming water flow is approximately tangential to the inner cylindrical surface of the chamber. This is so that a circulating motion can be transferred to the mercury for the purpose of maintaining the characteristics of electrical discharges between end face 94 and surface 98 of the mercury which acts as an electrode, the chamber portion 80 being electrically connected to a pole of an electrical discharge circuit 106 (a modified form of the circuit of FIG. 2) by means of screw 100 engaged in a threaded bore in the chamber portion 80. The inlet flow of water from pump 104 is controlled by fluid control valve 105 as mentioned previously.

The water is removed from the chamber cavity via an outlet passage 101 in flange 85.

Electrode carriers 89 and 90 are electrically connected to the electrical discharge circuit 106 which comprises a portion arranged to apply a voltage of about 1kV between electrode 95 and the chamber portion 80 to establish a degree of ionisation of the mercury in the vicinity of the discharge region between electrode 92 and the mercury surface 98. This discharge is called an initiating discharge. This technique is well-known and is used for example in a device called an ignitron. The energy of such initiating electrical discharge is of the order of 1 Joule. Discharge circuit 106 comprises another portion arranged to apply a voltage of about 20kV between electrode 92 and the chamber portion 80 in synchronism (by the use of a known discharge circuit) with the initiating discharge to cause an electrical discharge of the required characteristics. The energy of this latter discharge is in the range 10 to 100 Joules. The radiation emitted from the plasma of mercury vapour in the discharge region is at a wavelength of 254 nm and is particularly appropriate to the killing or deactivation of several strains of bacteria, yeast spores and fungi.

The initiating discharge can, if required, be effected between the electrode 95 and electrode 92.

Whereas in the apparatus of FIG. 10 the chamber portion 80 is formed of stainless steel, any other convenient material may be used, and, if necessary, a protective coating may be applied to the inner surfaces by for example chromium plating or vacuum deposition. The inner surfaces may have additional coatings for selective reflection or absorption of radiation at selected wavelengths, the coatings be covered by a protective layer of for example magnesium fluoride as mentioned previously. If the protective or other coatings are electrically insulating, electrical connection to the mercury may be effected by omitting these coatings over, say, the bottom wall 81 (if chamber portion 80 is conductive).

Where the material of chamber portion 80 is non-conductive, electrical connection may be made to the mercury by using, a conductive screw 100 and arranging for the threaded bore to communicate with the chamber cavity.

It will be appreciated that other conductive liquids or solutions may be used instead of the mercury, (the lower liquid), and other liquids instead of the water (the upper liquid). The choice of such liquids will depend on the desired wavelengths of the emitted radiation and on the electrical characteristics of the liquids, also, the upper liquid must be less dense than, and immiscible with, the lower liquid. The material of the chamber portion 80, or as the case may be, the protective layer or coating, is selected to have substantial immunity to chemical or electrochemical attack by either of the liquids in the chamber cavity, or their vapours, either separately, or in any combination.

If the ring portion 83 is electrically conductive at the high voltages it is subjected to, or if it made from a normally conductive material, the electrode carriers 89 and 90 may be mounted by means of insulating bushings (not shown).

The electrode 92 and 95 may be formed of tungsten or some other suitable conductive material. If necessary, the surface of the electrodes, apart from their working ends, may be covered with a protective coating as mentioned previously.

If it is not required to cause rotation of the mercury for depressing the surface immediately below the electrode 92, 95 then it will not be necessary to have a flow of water through passages 99 and 101, in other words the water in the chamber cavity can be substantially static.

In the aforedescribed embodiments the electrical connection to the electrodes is conveniently made by providing a tag or similar electrical connecting terminal (not shown) under the screw 23 at the outer end of the electrode assembly. It will be appreciated that either of a pair of electrodes may be connected to the more positive pole of the electrical discharge circuit.

It will be appreciated that the various alternative forms of electrode assemblies may be interchanged in the apparatus shown as required and as appropriate.

I claim:

1. A method of producing U.V. radiation comprising the steps of providing a discharge chamber, at least a portion of which is transparent to U.V. radiation, and a pair of spaced apart electrodes therein, supplying water to the region between the electrodes, and applying a high voltage between the electrodes whereupon the water undergoes electrical breakdown and an electrical discharge occurs between the electrodes, the electrodes and the supply of water being so arranged that at least a part of the electrical discharge path is submerged in the water to produce thereby a hot submerged plasma of ionized water which is unable to expand freely and which emits U.V. radiation.

2. The method of claim 1 wherein the electrodes are mounted in and insulated from the discharge chamber and wherein the high voltage is repetitively applied between the electrodes, and including the step of continuously sensing the electrical characteristics of the electrical discharges and continuously and automatically adjusting the spacing of the electrodes in response to the sensed characteristics so as to maintain predetermined electrical characteristics during the repetitive production of U.V. radiation.

3. The method of claim 1 wherein one of the electrodes is constituted by the discharge chamber, the other electrode is immersed in water within the discharge chamber, the water is arranged to have a circulatory motion within the discharge chamber, and the high voltage is repetively applied between the electrodes, and including the step of continuously sensing the electrical characteristics of the electrical discharges and continuously and automatically controlling the amount of this circulatory motion whereby the spacing of said other electrode and the overlying water surface is adjusted in response to the sensed characteristics so as to maintain predetermined electrical characteristics during the repetitive production of U.V. radiation.

4. An apparatus for producing U.V. radiation comprising a pair of spaced apart electrodes, a discharge chamber containing the region between the electrodes, at least a portion of the chamber being transparent to U.V. radiation, means arranged to supply water to the region between the electrodes such that in use upon application of a high voltage between the electrodes the water will undergo electrical breakdown and the resulting electrical discharge between the electrodes has at least a part of its path submerged in the water whereby the hot submerged plasma of ionized water thus produced is unable to expand freely and emits U.V. radiation, and means arranged to apply between the electrodes a high voltage of such magnitude as to cause electrical breakdown of the water and thereby producing U.V. radiation from the hot submerged plasma.

5. An apparatus for producing U.V. radiation comprising a discharge chamber, two electrodes mounted in and insulated from the discharge chamber such as to form a discharge region between the electrodes, at least one of the electrodes being mounted for adjustment of the electrode spacing, means arranged to apply repetitively a high voltage between the electrodes, means arranged to supply water to the discharge region such that upon application of the high voltage the water undergoes an electrical breakdown and the electrical discharge between the electrodes is along a submerged path in the water whereby the hot plasma of ionized water produced by the discharge is not able to expand freely and emits U.V. radiation, means arranged to continuously sense the electrical characteristics of the electrical discharges and to continuously and automatically adjust the spacing of the electrodes in response to the sensed characteristics so as to maintain predetermined electrical characteristics during the repetitive production of U.V. radiation, at least a portion of the discharge chamber being transparent to permit the U.V. radiation to be transmitted from the discharge chamber.

6. An apparatus for producing U.V. radiation comprising a discharge chamber which constitutes an electrode, another electrode disposed in the bottom of the discharge chamber, means arranged to supply water into the discharge chamber such as to cover said another electrode, means arranged to apply repetitively a high voltage between the discharge chamber and said another electrode, whereby the water repetitively undergoes electrical breakdown, the electrical discharge path being from said another electrode through the water to the surface and thence along the surface to the discharge chamber and whereby the hot submerged plasma of ionized water produced by the discharge is not able to expand freely and emits U.V. radiation, means arranged to sense continuously the electrical characteristics of the electrical discharges and to continuously and automatically control the water supplying means such as to alter the height of the water surface above said other electrode in response to the sensed characteristics so as to maintain predetermined electrical characteristics during the repetitive production of U.V. radiation, at least a portion of the discharge chamber being transparent to permit the U.V. radiation to be transmitted from the discharge chamber.

7. The apparatus of claim 6 wherein the water supplying means comprise liquid inlet and outlet passages in the discharge chamber arranged such as to effect a circulatory motion in the water in the discharge chamber, and wherein the sensing and controlling means is arranged to control the rate at which the water supplying means supplies the water, thereby to control the amount of said circulatory motion and thus the height of the water above said other electrode.

8. The apparatus of claim 7 wherein said other electrode is in the form of a rod positioned such that in use it is under the region where the surface of the circulating water has maximum depression.

9. The apparatus of claim 5 wherein said transparent portion is formed of quartz doped with a selected metallic ion such as to obtain selective absorption of an unwanted portion of the generated radiation.

10. The apparatus of claim 9 wherein the metallic ion is tungsten.

11. The apparatus of claim 6 wherein said transparent portion is formed of quartz doped with a selected metallic ion such as to obtain selective absorption of an unwanted portion of the generated radiation.

12. The apparatus of claim 11 wherein the metallic ion is tungsten.

13. A method of producing repetitive pulses of U.V. radiation comprising the step of establishing a continuous body of water between two spaced apart electrodes, the body of water being so arranged that upon applying a high voltage between the electrodes the water undergoes electrical breakdown and the electrical discharge path between the electrodes is at least partly submerged in the water to produce thereby a hot submerged plasma of ionized water which is unable to expand freely and which emits U.V. radiation, and the step of repetitively applying a high voltage between the electrodes thereby producing said repetitive pulses of U.V. radiation.

* * * * *